United States Patent [19]
Bakewell

[11] Patent Number: 4,881,087
[45] Date of Patent: Nov. 14, 1989

[54] PRINTHEAD STRUCTURE AND METHOD OF FABRICATION

[75] Inventor: Joseph J. Bakewell, Boxford, Mass.

[73] Assignee: Dynamics Research Corporation, Wilmington, Mass.

[21] Appl. No.: 163,365

[22] Filed: Mar. 2, 1988

[51] Int. Cl.[4] .................. G01D 15/16; G01D 15/10; H05B 1/00

[52] U.S. Cl. .................. 346/139 C; 219/216; 400/120; 346/76 PH

[58] Field of Search .................. 346/139 C, 76 PH; 219/216 PH; 400/120

[56] References Cited

U.S. PATENT DOCUMENTS

| | | | |
|---|---|---|---|
| 4,446,355 | 5/1984 | Sato | 346/76 PH |
| 4,472,875 | 9/1984 | Christian | 346/76 PH |

*Primary Examiner*—E. A. Goldberg
*Assistant Examiner*—Mark Reinhart
*Attorney, Agent, or Firm*—Weingarten, Schurgin, Gagnebin & Hayes

[57] ABSTRACT

An electrostatic or thermal printhead and method of fabrication is provided in which dielectric material is disposed in a row of spaced depressions or in a single recess along the upper surface of an edge of a dielectric-coated conductive sheet. Electrodes are disposed along the edge of the sheet over the dielectric material and terminate at associated conductive pads or printhead circuitry on the sheet. In one embodiment, the edge is trimmed and left bare to form an inexpensive electrostatic printhead. In an alternative embodiment, resistive material is disposed over the edge to connect the electrodes to the conductive sheet to form an inexpensive thermal printhead.

15 Claims, 2 Drawing Sheets

PRINTHEAD STRUCTURE AND METHOD OF FABRICATION

FIELD OF THE INVENTION

This invention relates to printheads and, more particularly, to an electrostatic or thermal printhead and method of fabrication.

BACKGROUND OF THE INVENTION

In electrostatic and thermal printing, printheads are used which typically comprise multiple substrates of printhead circuitry laminated together to form a single unit. In general, both electrostatic and thermal printheads contain one or more arrays of electrodes separated from a ground source by a substrate layer. Thermal printheads principally differ from electrostatic printheads by the addition of resistive material disposed along the length of the writing surface of the head and connecting the electrodes to the ground source.

Fabrication of electrostatic and thermal printheads by laminating multiple layers of substrates is expensive. The more layers and the more complex the structure, the longer, the more detailed and the more expensive must be the manufacture of a printhead.

SUMMARY OF THE INVENTION

The present invention is an inexpensive printhead fabricated by forming a row of depressions or, alternatively, a single recess at an edge on the upper surface of a dielectric-coated conductive sheet which functions as a ground plane. The depressions are filled with a dielectric material, and electrodes are disposed on the filled depressions and extend to conductive pads or other printhead circuitry on the sheet. The sheet is then preferably trimmed along a line through the filled depressions to form the printhead writing surface. The result is a printhead comprised of a dielectric-coated conductive sheet having an edge containing electrodes spaced from the sheet by the dielectric material.

In one embodiment, the edge is merely dressed, thereby completing an inexpensive electrostatic printhead. Energization of the printhead electrodes by driver circuitry creates an electrostatic potential, suitable for electrostatic printing, between the electrodes and the conductive sheet across the dielectric material.

In an alternative embodiment, the edge is dressed and resistive material in the form of individual resistors or a layer of resistive material is disposed over the edge and the dielectric material to connect the electrodes to the conductive sheet. This completes an inexpensive thermal printhead. Energization of the electrodes by driver circuitry causes current to pass through the resistive material to the conductive sheet, which causes the individual resistors or the resistive material between the electrodes and the conductive sheet to generate heat suitable for thermal printing.

DESCRIPTION OF THE DRAWINGS

The invention will be more fully understood by referring to the following detailed description read in conjunction with the accompanying drawings, of which.

DETAILED DESCRIPTION OF THE INVENTION

Figure 1:
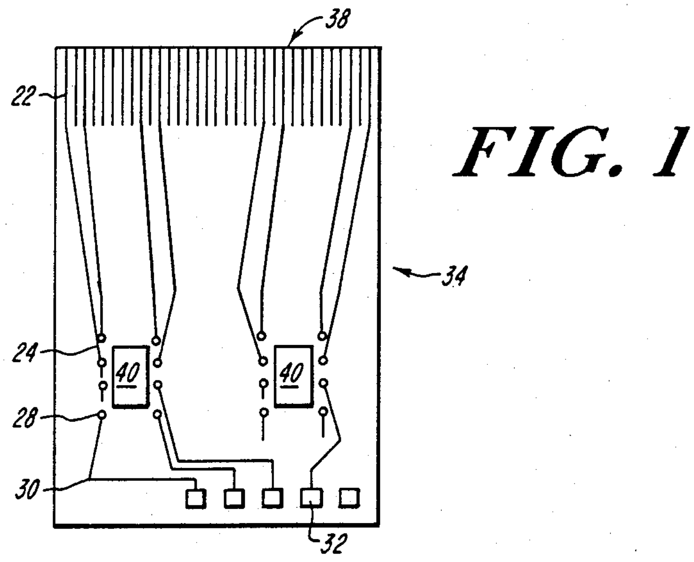
FIG. 1 is a plan view of a printhead constructed in accordance with the invention.
Figure 4:
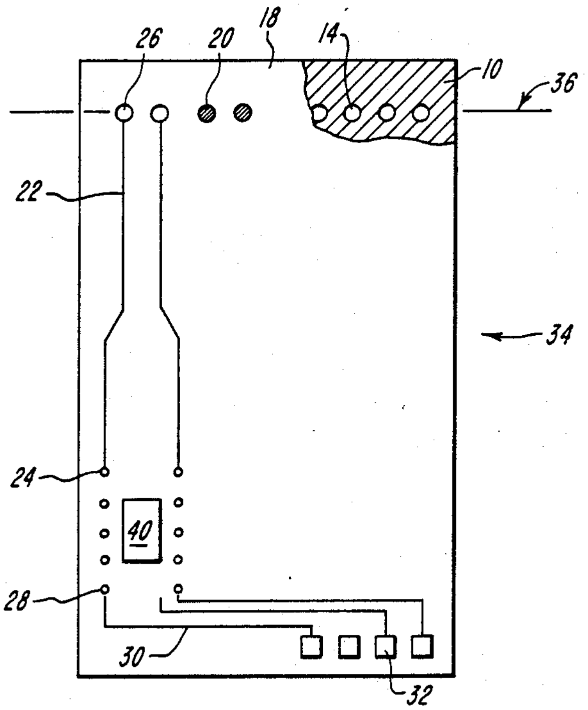
FIG. 4 is a plan view showing the construction of a printhead in accordance with the invention.
Figure 4A:
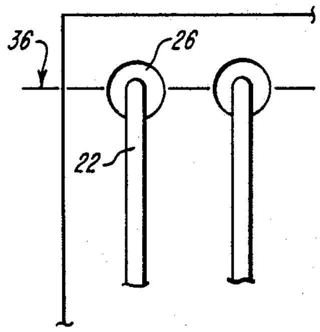
FIG. 4A is a detailed view of a portion of the printhead of FIG. 4.
Figure 5:
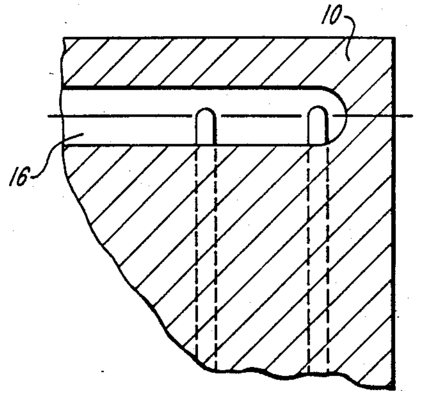
FIG. 5 is a detailed view of the conductive sheet at the first step of fabrication of an alternative embodiment of the invention.

Referring to FIGS. 4 and 4A, onto the upper surface of conductive sheet 10 near edge 12 a row of depressions 14 or, alternatively, a single recess 16 (FIG. 5), is etched or pressed. Sheet 10 is then completely covered, except for depressions 14, with dielectric coating 18. Depressions 14 are filled with dielectric material 20 until flush with the surface of dielectric coating 18. By vacuum deposit or other well-known methods, electrodes 22, leading to electrode conductive pads 24, are deposited over dielectric-filled depressions 26. At the same time and by the same vacuum deposit or other well-known methods, other conductive areas, such as driver conductive pads 28, conductors 30, and input/output pads 32, are deposited on sheet 10 with its dielectric coating 18. Printhead 34 is then cut along writing edge plane 36 to form writing edge 38 (FIG. 1). To complete the basic printhead, driver circuitry 40, typically in the form of semiconductor chips, are connected to electrode conductive pads 24 and driver conductive pads 28 by well-known techniques, such as wire bonding.

Figure 1A:
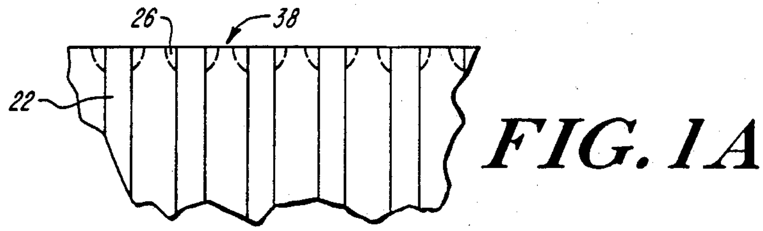
FIG. 1A is a detailed view of a portion of the thermal printhead of FIG. 1 showing the writing edge.
Figure 2:
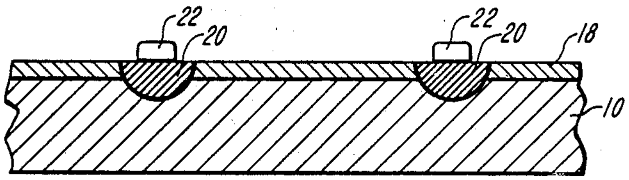
FIG. 2 is a sectional elevation view of a portion of the writing edge of an electrostatic printhead constructed in accordance with the invention.

Referring to FIGS. 1, 1A and 2, the result is printhead 34 having an array of electrodes 22 disposed over a row of dielectric-filled depressions 26 spaced along writing edge 38 on the upper surface of dielectric-coated conductive sheet 10.

In one embodiment, resulting printhead 34 is an inexpensive electrostatic printhead. Referring to FIG. 2, upon energization of electrode 22 an electrostatic potential suitable for electrostatic printing is created between electrode 22 and conductive sheet 10 across dielectric material 20.

Figure 3:
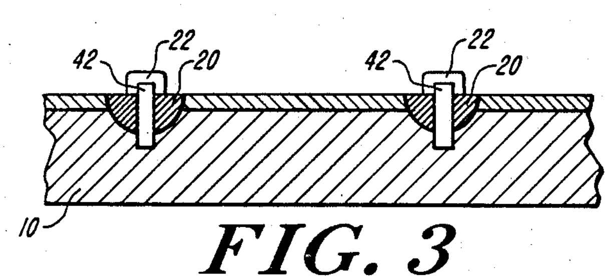
FIG. 3 is a sectional elevation view of a portion of the writing edge of a thermal printhead constructed in accordance with the invention.

In an alternative embodiment, resulting printhead 34 is modified to form an inexpensive thermal printhead. Referring to FIG. 3, resistive material, typically in the form of individual resistors 42, but also in the form of a layer of resistive material, is disposed on the writing edge over dielectric material 20 to connect electrodes 22 to conductive sheet 10. Energization of electrode 22 causes current to pass through resistor 42 to conductive sheet 10, which causes resistor 42 to generate heat suitable for thermal printing.

Having indicated a preferred embodiment of the present invention, it will occur to one skilled in the art that modifications and alternatives can be practised in the spirit of the invention. For example, in an alternative embodiment (not shown), printhead 34 (of FIGS. 1 and 4) can be fabricated without driver circuitry 40 disposed on the printhead. It is therefore intended that the scope of the invention be defined only by the following claims.

What is claimed is:

1. A printhead of a type having a writing plane on a side edge of the printhead, comprising:

a conductive sheet having a surface terminating at an edge, which edge defines the writing plane of the printhead;

a dielectric substance coating said surface of the conductive sheet and extending to said edge;

at least one dielectric-filled indentation in the dielectric coating and the conductive sheet and disposed along said edge of the conductive sheet; and an array of spaced electrodes disposed on said dielectric coating on said surface, each electrode beginning at said edge over the dielectric-filled indentation and extending to a conductive pad on said coating on said surface.

2. The invention of claim 1, further comprising driver circuitry disposed on said coating on said surface.

3. The invention of claim 1, further comprising resistive material disposed on said edge and connecting the electrodes to the conductive sheet.

4. The invention of claim 3, wherein said resistive material is comprised of a plurality of resistors, each resistor connecting an electrode to the conductive sheet.

5. The invention of claim 1, wherein said conductive sheet is made of metal.

6. A printhead of a type having a writing plane on a side edge of the printhead, comprising:

a conductive sheet having a surface terminating at an edge, which edge defines the writing plane of the printhead;

a dielectric substance coating said surface of the conductive sheet and extending to said edge;

a plurality of dielectric-filled depressions in the dielectric coating and the conductive sheet and disposed along said edge of the conductive sheet; and an array of spaced electrodes disposed on said dielectric coating on said surface, each electrode beginning at said edge over a dielectric-filled depression and extending to a conductive pad on said coating on said surface.

7. The invention of claim 6, further comprising driver circuitry disposed on said coating on said surface.

8. The invention of claim 6, further comprising resistive material disposed on said edge and connecting the electrodes to the conductive sheet.

9. The invention of claim 8, wherein said resistive material is comprised of a plurality of resistors, each resistor connecting an electrode to the conductive sheet.

10. The invention of claim 6, wherein said conductive sheet is made of metal.

11. A printhead of a type having a writing plane on a side edge of the printhead, comprising:

a conductive sheet having a surface terminating at an edge, which edge defines the writing plane of the printhead;

a dielectric substance coating said surface of the conductive sheet and extending to said edge;

a dielectric-filled recess in the dielectric coating and the conductive sheet and disposed along said edge of the conductive sheet; and an array of spaced electrodes disposed on said dielectric coating on said surface, each electrode beginning at said edge over the recess and extending to a conductive pad on said coating on said surface.

12. The invention of claim 11, further comprising driver circuity disposed on said coating on said surface.

13. The invention of claim 11, further comprising resistive material disposed on said edge and connecting the electrodes to the conductive sheet.

14. The invention of claim 13, wherein said resistive material is comprised of a plurality of resistors, each resistor connecting an electrode to the conductive sheet.

15. The invention of claim 11, wherein said conductive sheet is made of metal.

* * * * *